United States Patent Office 3,308,172

Patented Mar. 7, 1967

3,308,172

ASYMMETRIC SYNTHESIS OF ALCOHOLS

Bernard Rudner, Pittsburgh, and Richard A. Bafford, Delmont, Pa., assignors to Koppers Company, Inc., a corporation of Delaware

No Drawing. Filed Aug. 22, 1962, Ser. No. 218,567
6 Claims. (Cl. 260—638)

This invention relates to the use of chemical reagents having optical activity. In one specific aspect, it relates to the use of new optically active Grignard-type compounds in a novel asymmetric synthesis of optically active alcohols.

In our copending application Ser. No. 218,556, filed even date herewith, now U.S. Patent 3,139,442, we have disclosed and claimed a novel class of Grignard-type alkoxides and amines of the general formula RMgZR′, hereinafter defined. The R′ substituent of our compounds is optically active and is ordinarily characterized by one asymmetric carbon atom. Our new Grignard-type compounds can exist in any one of the following forms:

RMgZR′, RMgZR′·solvate, $RMgZR' \cdot MgX_2$, $RMgZR' \cdot MgX_2$·solvate, $R_2Mg \cdot Mg(ZR')_2$, $R_2Mg \cdot Mg(ZR')_2$·solvate, $R_2Mg \cdot Mg(ZR')_2 \cdot MgX_2$, $R_2Mg \cdot Mg(ZR')_2 \cdot MgX_2$·solvate.

We have found that these novel optically active reagents are useful, particularly in the form of their solvated halide adducts, in the asymmetric synthesis of optically active alcohols. According to Gilman, "Organic Chemistry" (2nd edition) vol. 1, p. 308, asymmetric syntheses are those processes for producing optically active compounds from optically inactive and unresolvable by the intermediate use of optically active reagents, but without the use of any of the methods of resolution. According to Gilman, all known asymmetric synthesis by chemical means are very inefficient, providing, at most, a 5 percent predominance of one optically active form over its racemate. The resolution of a racemic compound or mixture, indicated as *dl*-compound, into its optical antipodes (*d*-compound and *l*-compound) is generally a tedious and time-consuming task involving conversion to disastereoisomeric derivatives (e.g. the *dd*- and *ld*-salts of *dl*-acid and a *d*-base), separation of these into pure components by fractional crystallization and then conversion back to the desired pure isomer. Racemic tertiary alcohols are especially difficult to resolve, since their ease of dehydration makes derivatization practically impossible in some instances. Thus, in "The Resolution of Alcohols" (chapter 9 of vol. II of Organic Reactions (R. Adams, ed., John Wiley and Sons, N.Y.C., 1944) A. W. Ingersoll lists 122 alcohols successfully resolved by standard procedures; only five of these are tertiary alcohols.

An asymmetric synthesis in which even a minor predominance of one enantiomorph is obtained during the course of what would normally be the synthesis of a *dl*-compound is most advantageous. Unexpectedly, our novel asymmetric synthesis provides up to a 20 percent or greater predominance of one optically active form over its enantiomorph (e.g. *l*-content of product 60%, *d*-content of product 40%); a degree of optical purity approximately four times that normally achieved in chemical asymmetric synthesis. The novel synthesis is quite effective for the preparation of optically active tertiary alcohols, the resolution of which is particularly difficult, as noted hereabove.

Many of the optically active alcohols produced by our new method are optically active pharmaceuticals or are convertible by known means to optically active pharmaceuticals. The use of the optically active alcohols are pharmaceutical intermediate is particularly significant, since many pharmaceuticals exhibit physiological activity only in one of their optically active forms. The foregoing synthesis of alcohols is very flexible; by use of either the *d*- or *l*- starting compound in the asymmetric synthesis, the final product will have the corresponding absolute configuration. Pharmaceutically useful optically active alcohols or derivatives thereof include trihexyphenidyl hydrochloride, useful in the treatment of Parkinson's disease; alphaprodine hydrochloride, a useful analgetic; tridihexethyl iodide, a prasympatholytic agent particularly recommended for use in treating gastro-intestinal spasms; propoxyphene hydrochloride, which, in its *α-d* form, the most potent of two raecmates and four steroisomers, is sold as the analgesic Darvon, butamine hydrochloride, a commercial local anesthetic and *d*-desoxyephedrine hydrochloride, used in psychogenic disorders.

It is, therefore, an object of the present invention to provide a novel synthesis of optically active alcohols which are, inter alia, known pharmaceuticals or which are useful intermediates in the preparation of known pharmaceuticals.

In accordance with the invention, optically active alcohols are made by the induction of asymmetry into unsymmetrically substituted carbonyl compounds by reacting under anhydrous conditions a compound representable by the formula RMgZR′, wherein R is a hydrocarbon residue having from 1–28 carbon atoms; R′ is an optically active hydrocarbon residue having from 4–28 carbon atoms, at least one of said carbon atoms being asymmetric; and Z is a member selected from the group consisting of —O— and —N—R″, wherein R″ is a member selected from the group consisting of R and R′, with an unsymmetrically substituted carbonyl compound of the formula:

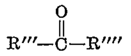

wherein R‴ is a member selected from the group consisting of R and R′ and R'''' is a member selected from the group consisting of R‴ and H, the members R, R‴ and R'''' being individually selected so that they represent dissimilar residues, thereby providing the product alcohol with at least one asymmetric carbon atom. The resulting reaction product is subjected to hydrolysis and an optically active alcohol of the formula:

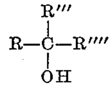

is recovered from the reaction mixture. In the above formula and in the equations and formulas that follow R, R‴ and R'''' have the values given aforesaid.

The process of the invention is more easily understood by referring to the following reaction sequence:

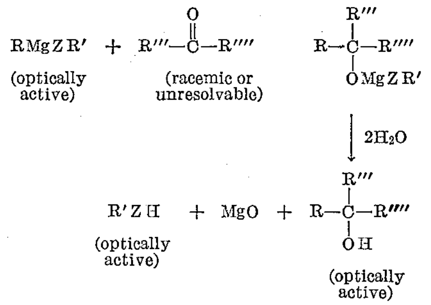

It is seen from the above equation that R, R‴ and R'''', while representing members that can be selected from the same group of hydrocarbon residues must be dissimilar hydrocarbon residues in order for hydroxyl-containing carbon atom of the product alcohol

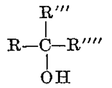

to be an asymmetric carbon atom. In the above exemplary reaction it is indicated that the unsymmetrically substituted carbonyl compound is optically inactive. However, the method of the invention also contemplates the use of unsymmetrically substituted ketones or aldehydes containing an asymmetric carbon atom. If the unsymmetrically substituted ketone already contains an asymmetric carbon atom, (e.g. R‴ is selected from the same group as R′), the product alcohol would have two asymmetric carbon atoms. From such a product there can be obtained two racemates (the *threo* racemate and *erythro* racemate) and four (two pair) optically active products on complete resolution. A normal synthesis, without asymmetric induction, could give more *threo* than *erythro,* or vice versa, but the resulting product would only be a mixture of racemates. If one wished to prepare e.g. the *d,d*-isomer, one would have to resolve the mixed racemates into four products to get the desired isomer. If the amount of *erythro* racemate was equal in quantity to the amount of *threo,* the yield of the *d,d*-isomer could never be more than 25 percent of theory, without racemization of *l,l-, l,d-,* and *d,l*-isomers and reresolution. The novel process of the invention not only improves the *threo* to *erythro* ratio (or vice versa), but provides optical activity directly so that the yield of *d,d*-isomer can never be less than 25 percent, without reracemization and reresolution.

The Grignard-type compounds useful in the novel asymmetric synthesis are those representable by the formula RMgZR′. As we have noted above, R is a hydrocarbon residue having from 1–28 carbon atoms. R′ is an optically active hydrocarbon residue having from 4–28 carbon atoms, one of the carbon atoms ordinarily being asymmetric. Z can be either oxygen or NR″, wherein R″ is either R or R′. The term hydrocarbon residue, as used throughout the specification and defined above by the number of carbon atoms that it includes, is intended to mean radicals made up primarily of carbon and hydrogen, free from reactive functional groups. Thus, the term R includes alkyl, e.g. methyl, ethyl, propyl, butyl, 2-butyl, 5,5-dimethylhexyl, 2-ethylhexyl, dodecyl, 6-docosanyl, 2-dimethylaminoethyl, and the like; alkenyl, e.g. vinyl, isopropenyl, allyl, methallyl, allyloxyethyl, 1- and 2-buta-1,3-dienyl, 1- and 2-penta-2,3-dienyl, 2,2-dimethylbut-3-enyl, 10-undecenyl, 9,12,15-octadecatrienyl, 12-tetracosenyl, and the like; alkinyl (free of active H), e.g. 2-butinyl, 10-undecynyl, 13-actacosynyl, and the like; cycloalkyl, e.g. cyclopropyl, 3-cyclopentenyl, cyclohexyl, hexahydrobenzyl, 2,8-dimethylcyclooctyl, 6-t-octyldecahydronaphthyl-1-, 3-β-chloestanyl, perhydroabietyl, (perhydrofluorenyl-9-)methyl, and the like; and cycloalkenyl, e.g. cyclopentadienyl, phenyl, p-ethylbenzyl, benzyl, p-anisyl, 3-pyridyl, naphthyl, 13-(cyclopent-2-enyl)tridecyl, α-cholesteryl, 9-fluorenyl, α-styryl, benzhydryl, campesteryl, and the like. R′ thus includes such optically active residues as *d*-menthyl, *l*-(2-cyclopentene-yl)methyl, *l*-campesteryl, *d*-2-butyl, *d-l*-spiro(4,5)dec-6-enyl, *l*-2-phenylbutyl, *d*-3-(1,2-allenyl)benzyl, 2,6-dimethyloctyl, 1,4-limonenyl, and the like. It is obvious that both R and R′ must be free of groups that react with Grignards, e.g. C≡CH, and the like.

The Grignard-type compound is prepared as described in our co-pending application Ser. No. 218,556, filed even date herewith, now U.S. Patent 3,139,442. One good method involves reacting under anhydrous, oxygen-free conditions a compound representable by the formula $R_2Mg \cdot MgX_2$ wherein X is a halogen having an atomic weight of at least 33 and R is as defined aforesaid, with a compound representable by the formula $Mg(ZR')_2$ wherein R′ and Z are as defined aforesaid.

It is especially convenient for purposes of our asymmetric synthesis to make the starting Grignard-type compounds by a method somewhat similar to the Zerewitinoff procedure for the determination of the active hydrogen content of an alcohol. An optical alcohol R′ZH is reacted under anhydrous, oxygen-free conditions with a normal Grignard according to the equation:

$$R'ZH + R_2Mg \cdot MgX_2 \rightleftharpoons RH + RMgZR' \cdot MgX_2$$

The use of this procedure is particularly effective, because the optically active starting compound for preparing the Grignard-type reactant, R′ZH, is recovered unchanged as a product of the asymmetric synthesis. Thus, our novel process makes possible the resolution of the carbinol during the course of its normal preparation by Grignard reaction, thereby avoiding (or reducing the number of) the tedious resolution steps ordinarily accompanying the preparation of an alcohol by Grignard reaction. The process uses, without consuming, available optically active amines and alcohols, e.g. menthol, neomenthol, isomenthol, carvomenthol, methylethylisopropyl carbinol, 3-methylcyclohexanol, α-methylbenzyl alcohol, thujol alcohol, borneol, desoxyephedrine, methyl-2-butylamine, 2-methylmorpholine, and the like. Specific reaction conditions used in the preparation of the Grignard reactant by this method are the same as those described hereafter for use in the asymmetric synthesis.

As we have noted hereabove, the Grignard-type compound, RMgZR′, used as a reactant in the novel asymmetric synthesis exists in a number of forms, depending upon its method of preparation. For purposes of the present invention we find it best to use a solvated, halide-associated Grignard-type compound. The loss of associated solvent (diethyl ether, tetrahydrofuran, and the like) decreases the activity of the reagent as a Grignard, but does not destroy its function as an asymmetry inducer. The loss of the halide greatly decreases the Grignard activity and therefore reduces the yield of product alcohol obtainable by the method of the invention. The loss of both associated solvent and halide is not desirable from the standpoint of Grignard activity, but does not prevent the asymmetric synthesis obtained by the method of the invention.

The unsymmetrically substituted carbonyl compounds used in the asymmetric synthesis of the invention are those having the formula:

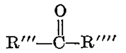

As noted hereabove, R‴ can be a member chosen from the same groups from which R and R′ are selected. R⁗ can also be selected from these groups (i.e. R⁗ can be from the same group as R‴, but not identical to R‴) when the unsymmetrically substituted carbonyl compound is a ketone. In this case the product of our asymmetric synthesis is a tertiary carbinol. When the unsymmetrically substituted carbonyl compound is an aldehyde, R⁗ is hydrogen and the product is a secondary carbinol. The aldehydes or ketones useful in the invention can also be used in the form of their N-substituted imines, e.g. Schiff bases or anils, to give optically active secondary amines. It is evident that for any specific unsymmetrically substituted carbonyl compound, R‴ cannot be identical to R⁗ (although both R‴ and R⁗ could both be selected from the same group, e.g. alkyl), because such compounds as formaldehyde, dimethyl ketone, and the like, give symmetrical, and therefore unresolvable carbinols. For the same reason, the R substituent of the Grignard-type compound, in any specific preparation, cannot be the same residue as R‴ or R⁗, since the carbon atom to which the OH group is attached in the product alcohol cannot be asymmetric if any of its substituents (i.e. R, R‴ and R⁗) represent the same residue. It is obvious that the same tertiary carbinol can be produced by an interchange of R, R‴ and R⁗; e.g.

the same carbinol is produced when R=$CH_3$, R'''=$C_2H_5$, and R''''=$C_3H_7$ as when R=$C_3H_7$, R'''=$C_2H_5$ and R''''=$CH_3$.

Unsymmetrically-substituted carbonyl compounds particularly useful in the method of the invention are those given below in Table I. In the table the compound is identified by its name and its R''' and R'''' substituents.

TABLE I

| R''' | R'''' | Name of Compound |
|---|---|---|
| $CH_3$ | H | Acetaldehyde. |
| 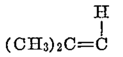 | $CH(CH_3)_2$ | Isopropyl isobutenyl ketone. |
| 4-$CH_3OC_6H_4$ | H | Anisaldehyde (aubepine). |
| 3-$Me_2NC_6H_4$ | $CH_3$ | 3-dimethylaminoacetophenone. |
| 2,4-$Me_2C_6H_3$ | $CH_2$:$CH(CH_2)_7CH_2$— | Undecenoylxylene. |
| 4-$ClC_6H_4$ | $C_6H_5$ | 4-chlorobenzophenone. |
| 3-$CH_3OC_6H_4$ | 4-$CH_3OC_6H_4$ | 2,4'-dimethoxybenzophenone. |
| 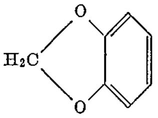 | 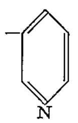 | 3-piperonylpyridine. |
| 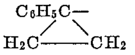 | $C_6H_5$ | 1-benzoyl-1-phenylcyclopropane. |
| 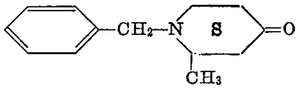 | | 1-benzyl-2-methylpiperidone-4. |
| $C_6H_5C\equiv C$— | 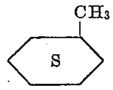 | 2-methylcyclohexyl phenylethinyl ketone. |
| 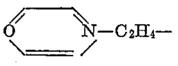 | n-$C_{18}H_{27}$ | Morpholinoethyl octadecylketone. |

The reaction between the Grignard-type compound and the unsymmetrically substituted carbonyl compound must be conducted under anhydrous conditions. The reaction medium must be free of all compounds containing active hydrogen atoms, e.g. alcohols, acids, compounds containing a terminal acetylynic group, and the like. It is preferable, but not necessary, that the reaction be oxygen-free; the absence of oxygen is more helpful during the Grignard preparation than it is during the Grignard reaction.

The reaction is conveniently conducted at a temperature ranging between −50° C. and 150° C. It is more costly, and therefore undesirable, to operate at temperatures below −50° C. and at temperatures somewhat above 100–150° C. there is considerable danger of destroying the reactant Grignard reagent.

The reaction is most conveniently conducted at atmospheric pressure, no advantage being obtained by using lower pressures. Higher pressures may be advantageous when the Grignard is prepared from volatile halides or sluggish components.

The mole ratio of the reactants is not critical; therefore, for most purposes, it is best to use substantially stoichiometric quantities. The carbonyl compound is less expensive than the Grignard reagent and is generally obtainable in higher purity. When the Grignard is prepared as described and claimed in our application Ser. No. 218,556, filed even date herewith, now U.S. Patent 3,139,442, it is normally 60–90 percent pure; thus, if stoichiometric quantities of unanalyzed reagents are charged, there is ordinarily present a slight excess of carbonyl compound. There is no particular advantage in using excess carbonyl compound or excess Grignard reagent, although when the compound RMgZR' is used in the form of its solvated halide, it is often advantageous to have present up to two moles of halide per mole of Grignard-type compound.

The use of a solvent for the reaction is not necessary. It is sometimes convenient to use an excess, e.g. up to 10 moles, of carbonyl compound as a solvent. If other solvents are used, the solvent chosen must be one which does not destroy the Grignard reactant. Suitable solvents of this class include ethers, such as diethyl ether, di-n-propyl ether, di-n-butyl ether, tetrahydrofuran, dioxane, diglyme, and the like; inert tertiary amines, such as triethylamine, tri-n-butylamine, tri-n-propylamine, N-methylpipiradine, dimethylaniline, pyridine, quinaldine, and the like; and inert hydrocarbons, such as heptane, cyclohexane, decane, and the like. The ethers and the amines of the above class form solvents with the Grignard reactant.

The hydrolysis of the reaction product of the Grignard-type compound and the unsymmetrically substituted carbonyl compound can be accomplished by adding to the reaction mixture at least a stoichiometric quantity of water or mildly acidic aqueous solution (pH 3–7). The addition of an aqeous solution of a strong mineral acid is not desirable, since such acid may cause partial dehydration of the carbonyl product to an optically inactive olefin. It is simplest, and therefore best, to drown the reaction mixture with a cold saturated aqueous ammonium chloride solution.

The product alcohol is recovered from the hydrolysis mixture by conventional techniques. It is convenient to take off the washed solvent layer containing the product, dry, strip off the solvent and distill or recrystallize. As noted hereabove, the co-product, R'ZH, can be recovered at this point and used in the preparation of additional Grignard Reactant. If the co-product is R'OH (Z—O), it is recovered by distillation. If Z=NR'' or if the product is an aminoalcohol, the amine may or may not be soluble in the aqueous layer of the reaction mixture, depending on the basocity of the amine. If the amine appears in the solvent layer, the solvent layer is extracted cold with acid to separate the amine (R'ZH or product) from the non-amine.

Our invention is further illustrated by the following examples:

EXAMPLE I

Ethylmagnesium bromide was prepared in 70–89 percent yield by the slow addition in a dry nitrogen purged flask of 120 g. (1.1 moles) ethyl bromide to a cooled, well stirred slurry of 24 g. clean, dry magnesium in 1000 ml. dry peroxide-free ether, followed by filtration under positive nitrogen pressure. An aliquot of the solution thus obtained containing 0.40 equivalent of $(C_2H_5)Mg \cdot MgBr_2$ as its etherate was transferred under nitrogen to another flask. The Grignard was then slowly reacted at 15–20° C. with 31.25 g. (0.20 equivalent) pure *l*-menthol; $[\alpha]_D^{22}$=47.7°. An exotherm developed immediately and ethane was evolved quantiatively from the reaction mixture. There resulted a clear, colorless solution containing 0.20 equivalent of ethylmagnesium *l*-menthoxide, $C_2H_5MgO \cdot C_{10}H_{19} \cdot nMgBr_2$·etherate. The solution thus obtained is suitable for immediate use in the novel asymmetric synthesis of alcohols.

EXAMPLE II

Ethylmagnesium bromide was prepared in ether by the standard procedure using 60 g. (0.55 m.) ethyl bromide, 12 g. (0.5 g. atom) dry magnesium and 250 ml. diethyl ether under nitrogen. The filtrate showed 75.2 percent yield by magnesium hydroxide titration. To the ether solution of the Grignard there was slowly added under a blanket of nitrogen with good stirring a solution containing 28.75 g. *l*-menthol ($[\alpha]_D^{22}=-47.7°$) in approximately 50 ml. of diethyl ether. The exotherm resulting from the reaction required holding the temperature to about 25° C. with a water bath. The reaction gave 300 ml. of clear solution containing 0.185 mole ethylmagnesium-*l*-menthoxide, $C_2H_5MgO \cdot l\text{-}C_{10}H_{19}$. The starting solution was treated dropwise over a period of about 20 minutes with 20 g. (0.2 mole) methylisobutyl ketone at ambient temperatures. The reaction mixture was stirred for about one-half hour after the addition was completed. The reaction product was hydrolyzed by the flow addition at room temperature of water saturated with ammonium chloride. The ether layer was separated, dried and stripped of solvent. The residue was fractionated to give a 67 percent yield of 2,4-dimethyl-4-hexanol (methylethylisobutyl carbinol) boiling at 55.8–56.1° C. at 15 mm. of Hg. The product was refractionated to give a heart cut boiling at 56.3–56.6° C. at 15 mm. of Hg and redistilled at atmospheric pressure to give a further heart cut boiling at 152° C. having a specific rotation of $[\alpha]_D^{22}=0.45°$, corresponding to 17 percent levo isomer and 83 percent racemic mixture. Vapor-phase chromatography and infrared analysis showed no menthol, ketones or olefins present.

EXAMPLE III $(C_2H_5)_2Mg \cdot MgBr_2$ was made as described in Example II in 89 percent yield. An ether solution containing 0.40 equivalent was treated with 0.20 mole (31.25 g.) *l*-menthol in 100 ml. diethyl ether. To this solution there was added 0.22 mole of diethyl ketone (18.9 g.) in 50 ml. diethyl ether. The reaction mixture was stirred for 30 minutes and thereafter hydrolyzed with aqueous ammonium chloride to give 19.2 g. of triethyl carbinol (3-ethylpentanol-3). The product alcohol on redistillation boiled at 141–143° C. and was optically inactive. This lack of optical rotation, expected because of the symmetrical nature of the carbinol product (R'''=R''''), proves that the optical rotation of the products of the previous examples is not due to *l*-menthol impurity or artifacts.

EXAMPLE IV

The procedure of Example II was repeated using *dl*-menthol, 68.6 g., in 150 ml. of diethyl ether in lieu of the *l*-menthol used in Example II. The *dl*-menthol was added slowly to 400 ml. of 2.15 N ethylmagnesium bromide. The resulting solution was treated with 55 ml. methylisobutyl ketone to give a 50 percent yield of optically inactive methylethylisobutyl carbinol. This example shows that the novel asymmetric synthesis is due to the optical activity of the Grignard-type reactant RMgZR' (or the compound R'ZH from which it is prepared) and not to purely steric conformation of the Grignard-ketone intermediate formation.

EXAMPLE V $Mg(O\text{-}l\text{-}C_{10}H_{19})_2$, 0.1 mole, prepared as described in our co-pending application Ser. No. 218,556, filed even date herewith, now U.S. Patent 3,139,442, was added to 350 ml. of ethylmagnesium bromide prepared from 22 g. ethyl bromide and 4.8 g. magnesium (a 1:1 mole ratio). The resulting halide adduct of the of the Grignard alkoxide was treated with a slight excess of the stoichiometric amount of methylisobutyl ketone and worked up to give methylethylisobutyl carbinol. After rigorous purification it was determined that the product was a mixture of 20 percent *l*-isomer and 80 percent *dl*-isomer by polarimetry.

EXAMPLE VI

The procedure of Example V was repeated using 0.3 mole of magnesium *l*-menthoxide in the reaction mixture. The same degree of asymmetric synthesis was achieved, proving that the new synthesis is not an environmental effect, such as is obtainable by the use of optically active solvents for the reaction.

EXAMPLE VII

The procedure of Example V was repeated using a ratio of 10 moles of ethylmagnesium bromide to one mole of magnesium-*l*-menthoxide. There resulted only a 4 percent excess of the levo isomer from the asymmetric synthesis, proving that the novel synthesis is not a catalytic effect, but a stoichiometric one.

EXAMPLE VIII

Halide-free ethylmagnesium-*l*-menthoxide in ether solution was made by the addition of 27 g. *l*-menthol in 100 ml. diethyl ether to 150 ml. 2.3 N diethylmagnesium (bromide free) in diethyl ether-dioxane. This solution was treated with 20 g. of methylisobutyl ketone and the reaction mixture was allowed to stir at reflux for one hour. The reaction product was hydrolyzed and worked up as described in Example II to give about a 5 percent yield of methylethylisobutyl carbinol, containing a small amount of excess *l*-carbinol, but no unconsumed methylisobutyl ketone, and, instead, approximately 94 percent of a thick oil, characterized as a ketone self-condensation product:

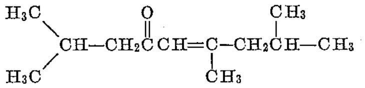

Ethane was also formed in the reaction, presumably from the action of water on unreacted Grignard alkoxide.

EXAMPLE IX

The procedure of Example VIII was repeated using menthoxide-free, halide-free diethylmagnesium. Methylisobutyl ketone, 33 g., in 50 ml. of diethyl ether was slowly added to 200 ml. 1.25 N diethylmagnesium in ether-dioxane. An exotherm resulted and the reaction was refluxed, hydroylzed and worked up to give a 10 percent yield of optically inactive methylethylisobutyl carbinol and slightly less than a 50 percent yield of the ketone self-condensation product obtained in Example VIII.

EXAMPLE X

A 150 ml. quantity of 3 N $(CH_3)_2Mg \cdot MgBr_2$) in ether was treated with 150 ml. diethyl ether containing 30 g. anhydrous $MgCl_2$. The mixture was stirred to uniformity, then slowly treated with 33.5 g. *d*-2-methylaminopropylbenzene in 200 ml. diethyl ether. The resulting mixture was stirred overnight, then treated slowly with 30 g. propiophenone, allowed to react fully and drowned in aqueous $NH_4Cl$. The ether layer was washed with dilute phosphoric acid to remove the last traces of optically active amine (most of which was in aqueous $NH_4Cl$ layer), then distilled. Because not all of the acid had been removed from the dried ether layer, the product, methylethylphenylcarbinol, underwent partial dehydration during distillation, and the resultant dried distillate was presumably carbinol mixed with propiophenone and phenylbutenes. The *l*-carbinol content of the product was only about 10.5 percent. Attempts to prepare the same carbinol using the same optically active amine without added magnesium chloride were less successful, even when a higher boiling solvent was used.

EXAMPLE XI

The outstanding advantages afforded by the method of the invention are clearly demonstrated by comparing the foregoing preparative examples with the involved conventional resolution of *dl*-alcohol.

A 130 g. quantity of *sec*-octanol (2-octanol) and 146 g. phthalic anhydride (one mole each) was stirred 15 hours under reflux at 110–115° C. The mixture was cooled and poured into a solution of 130 g. of sodium carbonate and 8000 ml. water. The mixture was stirred to solution, clarified, and there was carefully added thereto a 5 percent aqueous solution of hydrochloric acid with stirring to precipitate *dl*-octylhydrogen phthalate. The precipitate was recovered by filtration and dried to give a 247 g. yield of 2-octylhydrogen phthalate. Air-dried *l*-brucine dihydrate (200 g.) was added to 141 g. of the *dl*-monoester and extracted with 300 ml. of acetone until a clear solution was obtained. The solution was cooled and filtered through sintered glass to remove crude, insoluble 2-octylhydrogen phthalate-*l*-brucine salt. The cake was pressed well under a rubber dam to remove the mother liquor and then washed in a funnel with 125 ml. of cold, dry acetone. The washings were added to the filtrate and set aside. The crystals (transferred to a beaker) were covered and there was added slowly with stirring a 1:1 solution of cold aqueous hydrochloride acid (about 60 ml.). Acetone was added to the mixture to maintain homogeneity. Ice water was added until no more crude *d*-2-octylhydrogen phthalate precipitated. The mixture was filtered to give a 75 percent yield (69 g. ester). An equal quantity of crude *l*-ester was obtained by concentrating the filtrate and washings to one-half volume and pouring the concentrate into slightly more than the calculated amount of aqueous 1:1 hydrochloride acid. There was then added 300 ml. of water and the solution was filtered. Each isomeric ester was separately hydrolyzed by first recrystallizing from twice its weight of 90 percent acetic acid, then steam distilling from solution of ester in 30 percent caustic containing two mole sodium hydroxide per mole of ester. Each resultant alcohol was separated, dried over magnesium sulfate and distilled at 25° C. and 20 mm. of Hg pressure. The yield from this step was 93 percent and 88 percent respectively, $[\alpha]_D=+9.6, -9.7°$, and therefore 96.5 and 97.6 percent optically pure.

EXAMPLE XII

To 100 ml. of 2.15 N $(C_2H_5)_2Mg \cdot MgBr_2$ solution in diethyl ether there was added over a seven hour period 13.9 g. *d*-2-octanol in 100 ml. diethyl ether. The mixture was stirred overnight. There was then added at 0–3° C. over a five hour period a solution of 13 g. acetophenone in diethyl ether. The resulting mixture was stirred in an ice bath overnight and hydrolyzed cold with a saturated aqueous ammonium chloride solution. The solvent was stripped off, dried, and distilled to give a quantitative yield of *d*-2-octanol, B.P. 85–87° C. at 20 mm. of Hg, and 11 g. crude methylethylphenylcarbinol. The fraction boiling at 80° C. at 4 mm. pressure, 7.5 g., was levorotary.

EXAMPLE XIII

A 75 ml. quantity of 3.03 N $(C_6H_5)_2Mg \cdot MgBr_2$ in diethyl ether was treated with 14.69 g. *d*-2-octanol in 100 ml. diethyl ether and 8.2 g. methylethyl ketone. There was obtained about a 20 percent greater yield of the same carbinol as that of Example XII. The product exhibited a 46 percent increase in levorotary carbinol concentration.

EXAMPLE XIV

The procedure of Example XIII was repeated using substantially identical quantities of reactants, but with the exception that *l*-2-octanol was used in place of the *d*-2-octanol of the previous example. There was obtained a slightly reduced yield of dextrorotary carbinol, having about the same degree of optical purity.

EXAMPLE XV

From 200 ml. 1.5 N $(CH_3)_2Mg \cdot MgBr_2$, 19.5 g. *l*-2-octanol in 100 ml. diethyl ether, and 20 g. of the Schiff base, benzylidineethylamine ($C_6H_5CH{:}NC_2H_5$) in 100 ml. of diethyl ether, there was obtained, after refluxing for two hours followed by hydroylsis with 1:1 hydrochloric acid, a minor quantity of very weakly optically active *l*-phenyldiethylamine.

EXAMPLE XVI

The procedure of Example XV was repeated using 23.1 g. *l*-borneol in lieu of the octanol. Similar results were obtained.

EXAMPLE XVII

To a 200 ml. quantity of 0.214 N $(C_2H_5)_2Mg \cdot MgBr_2$ there was added 33 g. *l*-borneol in 125 ml. diethyl ether over a period of 12 hours at room temperature. The resulting mixture was treated with 26 g. acetophenone and hydrolyzed to give 14.3 g. crude phenylmethylethylcarbinol, levorotary.

EXAMPLE XVIII

A 200 ml. quantity of 1.5 N $(CH_3)_2Mg \cdot MgBr_2$ was treated over an eight hour period with 58 g. cholesterol in 600 ml. diethyl ether then with 15.9 g. benzaldehyde in 100 ml. ether at 5–10° C. The resulting mixture was stirred for six hours at room temperature and then drowned in aqueous ammonium chloride. The ether layer was washed with sodium bisulphite to remove benzaldehyde after being concentrated and filtered from precipitated cholesterol. The solvent was stripped off and the residue was distilled to give phenylmethyl carbinol B.P. at 39–42° C. at 0.8 mm. of Hg. $[\alpha]_D^{25}=0.21°$, dextrorotary.

EXAMPLE XIX

A dried residue of phenylmagnesium *d*-α-tocopheroxide in benzene, prepared as described in our co-pending application, Ser. No. 218,556, filed even date herewith, now U.S. Patent 3,139,442, was treated at room temperature with 100 percent excess racemic 3-methylcyclohexanone in an equal volume of benzene. The mixture was held at 50° C. with stirring for two hours, then drowned at 10° C. in saturated aqueous ammonium chloride solution. The benzene layer was washed with 5 percent aqueous sodium bisulphite, 1 percent aqueous sodium hydroxide, and water. It was thereafter dried and concentrated to give weakly dextrorotary 3-methyl-1-phenylcyclohexanol.

EXAMPLE XX

Benzylmagnesium chloride, prepared from 4.8 g. magnesium, 25.3 g. benzylchloride and 250 ml. tetrahydrofuran was admixed with 34.8 g. cholesterol in 200 ml. tetrahydrofuran. The resulting white suspension was treated with a solution of 20.47 g. dimethyl-(2-benzoyl) propylamine in 200 ml. tetrahydrofuran over a 40 minute period at 5–50° C. The resulting mixture was stirred overnight and thereafter hydrolyzed with saturated ammonium chloride solution. The upper tetrahydrofuran layer was separated and dried. Saturation with dry hydrochloric acid failed to precipitate the desired salt. The tetrahydrofuran layer was therefore concentrated in vacuo, taken up in dry diethyl ether and resaturated cold with dry HCl to precipitate oily, levorotary, 1,2-diphenyl-3-methyl-4-dimethylamino-2-butanol. An optically active form of the propionylester of this alcohol is an analgesic (Propoxyphene Hydrochloride) equal in analgesic potency to codeine and much less toxic than morphine sulfate.

EXAMPLE XXI

Sodium-*l*-menthoxide was prepared in heptane from 4.2 g. sodium and 25 g. *l*-menthol. When the reaction ceased, the mixture was filtered free of excess sodium to give, by titration, a 0.6 N solution representing a quantitative yield of sodium-*l*-menthoxide, $[\alpha]_D=14.5\pm0.3°$, specific rotation. During this time, cyclohexylmagnesium bromide was made from ½ mole magnesium and ½ mole distilled cyclohexylbromide in diethyl ether. After clarifying, the solution was evaporated down and thereafter held for three days at 0.5–3 mm. of Hg and 30–32° C. until no more loss of weight was observed. Titration showed at 62 percent yield of $(C_6H_{11})Mg \cdot MgBr_2$. The Grignard was taken up in toluene to give an 0.2 molar solution. The two solutions were mixed in stoichiometric quantities (2 moles of alkoxide to one mole of Grignard) and stirred for two hours at room temperature. The reaction mixture was clarified free of sodium to give a clear, light brown solution of $$(C_6H_{11})_2Mg \cdot Mg(l-OC_{10}H_{19})_2$$

representing an 84 percent yield based on the amount of sodium bromide precipitated.

We claim:

1. Method of making optically active alcohols from unsymmetrically-substituted carbonyl compounds comprising reacting under anhydrous conditions a compound represented by the formula RMgZR′ wherein R is a hydrocarbon residue selected from the group consisting of alkyl, alkenyl, alkinyl, cycloalkyl and cycloalkenyl having from 1–28 carbon atoms; R′ is an optically active hydrocarbon residue selected from the group consisting of alkyl, alkenyl, alkinyl, cycloalkyl and cycloalkenyl having from 4–28 carbon atoms, at least one of said carbon atoms being asymmetric; and Z is a member selected from the group consisting of —O— and —N—R″, wherein R″ is a member selected from the group consisting of R and R′, with an unsymmetrically substituted carbonyl compound of the formula:

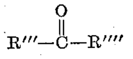

wherein R‴ is a member selected from the group consisting of R and R′, and R⁗ is a member selected from the group consisting of R‴ and H, the members R, R‴ and R⁗ being individually selected so that the hydroxyl-containing carbon atom of the product alcohol is an asymmetric carbon atom, subjecting the reaction product to hydrolysis and recovering an optically active alcohol from the reaction mixture.

2. Method of making optically active alcohols from unsymmetrically-substituted carbonyl compounds comprising reacting under anhydrous conditions at a temperature of −50 to 150° C. a halide-associated, solvated compound represented by the formula RMgZR′ wherein R is a hydrocarbon residue selected from the group consisting of alkyl, alkenyl, alkinyl, cycloalkyl and cycloalkenyl having from 1–28 carbon atoms; R′ is an optically active hydrocarbon residue selected from the group consisting of alkyl, alkenyl, alkinyl, cycloalkyl and cycloalkenyl having from 4–28 carbon atoms, at least one of said carbon atoms being asymmetric; and Z is a member selected from the group consisting of —O— and —N—R″, wherein R″ is a member selected from the group consisting of R and R′, with an unsymmetrically substituted carbonyl compound of the formula:

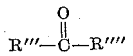

wherein R‴ is a member selected from the group consisting of R and R′ and R⁗ is a member selected from the group consisting of R‴ and H, the members R, R‴ and R⁗ being individually selected so that the hydroxyl-containing carbon atom of the product alcohol is an asymmetric carbon atom, subjecting the reaction product to hydrolysis and recovering an optically active alcohol from the reaction mixture.

3. Method according to claim 2 wherein the reaction is conducted in the presence of an ether.

4. Method of inducing optical activity into asymmetrically substituted secondary and tertiary carbinols during their preparation comprising reacting under anhydrous, oxygen free conditions a compound represented by the formula $R_2Mg \cdot MgX_2$ wherein X is a halogen having an atomic weight of at least 33 and R is a hydrocarbon residue selected from the group consisting of alkyl, alkenyl, alkinyl, cycloalkyl and cycloalkenyl having from 1–28 carbon atoms, with a compound of the formula R′ZH wherein R′ is an optically active hydrocarbon residue selected from the group consisting of alkyl, alkenyl, alkinyl, cycloalkyl and cycloalkenyl having from 4–28 carbon atoms and Z is a member selected from the group consisting of —O— and —N—R″, wherein R″ is a member selected from the group consisting of R and R′, adding thereto an unsymmetrically substituted carbonyl compound of the formula:

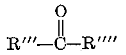

wherein R‴ is a member selected from the group consisting of R and R′, and R⁗ is a member selected from the group consisting of R‴ and H, the members R, R‴ and R‴ being individually selected so that the hydroxyl-containing carbon atom of the product alcohol is an asymmetric carbon atom, subjecting the reaction product to hydrolysis and recovering from the reaction mixture an optically active alcohol and said compound R′ZH, wherein R′ and Z are as defined aforesaid.

5. Method according to claim 4 wherein the reaction is conducted in the presence of an ether.

6. Method of making optically active 2,4-dimethyl-4-hexanol comprising reacting under anhydrous conditions at a temperature of −50 to 150° C. halide-associated, ether-solvated, optically active ethylmagnesium menthoxide and methylisobutyl ketone, subjecting the reaction mixture to hydrolysis and recovering optically active 2,4-dimethyl-4-hexanol from the reaction mixture.

References Cited by the Examiner

UNITED STATES PATENTS

| | | | |
|---|---|---|---|
| 2,680,115 | 6/1954 | Ruddy et al. ---- | 260—570.6 X |
| 2,725,399 | 11/1955 | Denton ----------- | 260—570.6 |

FOREIGN PATENTS

| | | |
|---|---|---|
| 384,156 | 12/1932 | Great Britain. |

OTHER REFERENCES

Finar: "Organic Chemistry," pp. 26 to 30, 1959.

Kharasch et al.: "Grignard Reactions of Nonmetallic Substances," (1954), pp. 44, 104–109 and 138–141.

Mosher et al.: "J. Am. Chem. Soc.," vol. 72, pp. 3994, 4991 (1950).

Newman: "Steric Effects in Organic Chemistry," 1956, pp. 395 to 424.

LEON ZITVER, *Primary Examiner.*

IRVING MARCUS, *Examiner.*

R. V. HINES, J. E. EVANS, *Assistant Examiners.*